(12) United States Patent
Cho et al.

(10) Patent No.: US 10,412,130 B2
(45) Date of Patent: Sep. 10, 2019

(54) METHOD AND APPARATUS FOR PLAYING MEDIA STREAM ON WEB BROWSER

(71) Applicant: HANWHA TECHWIN CO., LTD., Seongnam-si (KR)

(72) Inventors: Sung Bong Cho, Changwon-si (KR); Sujith Kunhi Raman, Changwon-si (KR); Yogavanan Mathivanan, Changwon-si (KR); Tarak Ramgopal Anumolu, Changwon-si (KR); Venkateswara Rao Aravapalli, Changwon-si (KR)

(73) Assignee: HANWHA TECHWIN CO., LTD., Seongnam-si (KR)

( * ) Notice: Subject to any disclaimer, the term of this patent is extended or adjusted under 35 U.S.C. 154(b) by 203 days.

(21) Appl. No.: 15/393,936

(22) Filed: Dec. 29, 2016

(65) Prior Publication Data

US 2017/0289214 A1 Oct. 5, 2017

(30) Foreign Application Priority Data

Apr. 4, 2016 (KR) .................. 10-2016-0041175
Apr. 5, 2016 (KR) .................. 10-2016-0041426

(Continued)

(51) Int. Cl.
*G06F 15/16* (2006.01)
*H04L 29/06* (2006.01)
(Continued)

(52) U.S. Cl.
CPC ...... *H04L 65/4015* (2013.01); *H04L 65/1059* (2013.01); *H04L 65/4069* (2013.01);
(Continued)

(58) Field of Classification Search
CPC . H04L 65/4015; H04L 65/604; H04L 65/608; H04L 65/607; H04N 19/44
See application file for complete search history.

(56) References Cited

U.S. PATENT DOCUMENTS 7,808,503 B2 10/2010 Duluk, Jr. et al.
2009/0164655 A1* 6/2009 Pettersson ........... H04L 65/4015
709/231

(Continued)

FOREIGN PATENT DOCUMENTS

JP 2002-526842 A 8/2002
JP 2016-517642 A 6/2016
(Continued)

OTHER PUBLICATIONS

Communication dated Jun. 22, 2017 by the Korean Intellectual Property Office in counterpart Korean patent application No. 10-2016-0069468.

(Continued)

*Primary Examiner* — Kyung H Shin
(74) *Attorney, Agent, or Firm* — Sughrue Mion, PLLC

(57) ABSTRACT

A media stream playing apparatus for receiving a media stream transmitted from a media service unit and playing the media stream on a web browser is provided. The media stream playing apparatus includes a transmission module configured to establish a communication connection at a transport layer level with the media service unit, a websocket module configured to establish a websocket connection with the media service unit via a handshake procedure based on the communication connection and transmit or receive websocket packets to or from the media service unit while maintaining the websocket connection, a streaming module configured to receive Real-time Transport Protocol (RTP) packets carried by the websocket packets, a media decoder configured to decode the media stream obtained (Continued)

from the RTP packets to reconstruct video, and an output device configured to display the reconstructed video on a screen by embedding the reconstructed video in the web browser.

23 Claims, 14 Drawing Sheets

(30) Foreign Application Priority Data

Jun. 3, 2016 (KR) .................. 10-2016-0069443
Jun. 3, 2016 (KR) .................. 10-2016-0069468

(51) Int. Cl.
| | |
|---|---|
| *H04N 19/44* | (2014.01) |
| *H04L 29/08* | (2006.01) |
| *H04N 21/2187* | (2011.01) |
| *H04N 21/6437* | (2011.01) |
| *H04N 21/81* | (2011.01) |

(52) U.S. Cl.
CPC .......... *H04L 65/604* (2013.01); *H04L 65/607* (2013.01); *H04L 65/608* (2013.01); *H04L 67/02* (2013.01); *H04N 19/44* (2014.11); *H04N 21/2187* (2013.01); *H04N 21/6437* (2013.01); *H04N 21/8173* (2013.01)

(56) References Cited

U.S. PATENT DOCUMENTS

| | | | |
|---|---|---|---|
| 2015/0088977 A1 | 3/2015 | Monesson | |
| 2015/0350723 A1 | 12/2015 | He | |
| 2016/0029002 A1 | 1/2016 | Balko | |
| 2016/0119399 A1* | 4/2016 | Glass | ............... H04N 19/44 709/219 |

FOREIGN PATENT DOCUMENTS

| | | | |
|---|---|---|---|
| KR | 10-2010-0072113 A | 6/2010 |
| KR | 10-2012-0015037 A | 2/2012 |
| KR | 10-2014-0053791 A | 5/2014 |
| KR | 10-2015-0119003 A | 10/2015 |

OTHER PUBLICATIONS

Extended European Search Report dated Aug. 3, 2017 by the European Patent Office in counterpart European patent application No. 17150632.2.

Dominic Szablewski, "HTML5 Live Video Streaming via WebSockets—PhobosLab," Sep. 11, 2013, Total 33 pages, Retrieved from the Internet: http://phoboslab.org/log/2013/09/html5-live-video-streaming-via-websockets [retrieved on Jul. 24, 2017].

I. Fette et al., "The WebSocket Protocol," Google, Inc., Dec. 11, 2011, pp. 1-71, Internet Engineering Task Force (IETF), Rue Des Falaises CH-1205 Geneva, Switzerland.

Anonymous, "RTP over Websocket—Stack Overflow," Sep. 17, 2013, Total 1 page, retrieved from the Internet: https://stackoverflow.com/questions/18844534/rtp-over-websocket [retrieved on July 25, 2017].

Anonymous, "HTML5 RTSP Player. Streamedian/html5_rtsp_player Wiki. GitHub," May 23, 2016, Total 4 pages, retrieved from the Internet: https://github.com/Streamedian/html5_rtsp_player/wiki/HTML5-RTSP-Player/c09222ab2c6d20da7fca626225d8d75095528bl [retrieved on Jul. 25, 2017].

Communication issued by the Korean Intellectual Property Office dated Dec. 31, 2017 in counterpart Korean Patent Application No. 10-2016-0069443.

Communication issued by the Korean Intellectual Property Office dated Jan. 4, 2018 in counterpart Korean Patent Application No. 10-2016-0069468.

* cited by examiner

FIG. 6

| bit | 0 | 1 | 2 | 3 | 4 | 5 | 6 | 7 | 0 | 1 | 2 | 3 | 4 | 5 | 6 | 7 | 0 | 1 | 2 | 3 | 4 | 5 | 6 | 7 | 0 | 1 | 2 | 3 | 4 | 5 | 6 | 7 |
|---|---|---|---|---|---|---|---|---|---|---|---|---|---|---|---|---|---|---|---|---|---|---|---|---|---|---|---|---|---|---|---|---|
| | FIN | RSV1 | RSV2 | RSV3 | opcode (4bit) | | | | MASK | Data length (7bit) | | | | | | | Extended data length | | | | | | | | | | | | | | | |
| Extended data length |||||||||||||||||||||||||||||||||
| Extended data length |||||||||||||||| Masking-key ||||||||||||||||
| Masking-key |||||||||||||||| Data ||||||||||||||||
| Data |||||||||||||||||||||||||||||||||
| Data |||||||||||||||||||||||||||||||||

METHOD AND APPARATUS FOR PLAYING MEDIA STREAM ON WEB BROWSER

CROSS-REFERENCE TO RELATED APPLICATIONS

This application claims priority from Korean Patent Application Nos. 10-2016-0041175 filed on Apr. 4, 2016, 10-2016-0069443 filed on Jun. 3, 2016, 10-2016-0041426 filed on Apr. 5, 2016 and 10-2016-0069468 filed on Jun. 3, 2016 in the Korean Intellectual Property Office, the disclosure of which are incorporated herein by reference in their entireties.

BACKGROUND

1. Field

Apparatuses and methods consistent with exemplary embodiments relate to a method and apparatus for playing a media stream on a web browser, and more particularly, to a technique for streaming video and audio acquired by a camera in a web browser directly without a plug-in.

2. Description of the Related Art

Media contents can be accessed by a plurality of user devices connected to various types of video source via the Internet. To this end, a web browser is installed in the user devices to communicate with a server application by using a hypertext transfer protocol (HTTP). However, the web browser using a half-duplex scheme is not suitable for streaming media because an overhead occurs due to repeated information exchanges through HTTP requests and response messages.

According to a conventional HTTP connection method shown in FIG. 1, after a web browser 15 transmits a connection request message (long-lived request) to a web server 25, the request is switched into a request suspended state by the web server 25 and a connection between the web browser 15 and the web server 25 is established. In this state, the web browser 15 sends a command (client action) for performing a specific action to the web server 25, and the web server 25 transmits a response message to the web browser 15 in response to the client action. For example, if the command (client action) is a request for streaming certain video, the response message will be video packet data. This connection can be disconnected when the web server 25 sends a completion command (long-lived request completes) to the web browser 15. Thereafter, if the web browser 15 intends to additionally request the streaming, the above process may be repeated.

That is, in a communication scheme between a web server and a web browser using the conventional HTTP connection method, a connection between the web server and the web browser is required for each specific event and the connection is terminated when the specific event ends. Thus, the scheme is suitable for processing non-consecutive events such as connection to a web page, but is not suitable for applications, such as video and audio streaming, that require a continuous connection between the web server and the web browser.

Accordingly, various types of plug-ins (e.g., ActiveX, Netscape Plugin Application Programming Interface (NPAPI), Pepper Plugin Application Programming Interface (PPAPI)) are installed in the web browser to implement a function of performing a network connection between the web browser and the web server, a function of decoding the received video and a function of outputting the decoded video. In particular, a network camera generally has a feature called "Web Viewer" capable of receiving and outputting video and audio. This feature called "Web Viewer" allows a plug-in to be installed automatically when a user is connected to the network camera at a remote location by entering a network address of the camera without installing software such as Central Monitoring System (CMS) or Video Management System (VMS) such that the user can receive video and audio through the plug-in. In order to provide this feature, the network camera is equipped with a web server that can provide web services. Therefore, in a conventional web service method, when a user terminal equipped with a web browser is connected to a web server through a specific Uniform Resource Locator (URL), a plug-in is automatically installed and a function of transmitting and receiving video and audio can be achieved through the plug-in.

However, such a method of installing a plug-in in a web browser tends to be used less frequently because it causes many problems such as security vulnerabilities, the web browser's limited functionality and excessive consumption of resources. In addition, as other examples of the standard for transmitting the video stream, HTML5 supports a function of receiving a video file stored in a remote source through a video tag, and Web Real-Time Communication (WebRTC), openWebRTC, Dynamic Adaptive Streaming over HTTP (MPEG-DASH) and the like provide standards for transmitting and receiving video in real time.

Thus, due to the recent trend of excluding plug-in techniques, the function of receiving, playing and displaying video can be implemented according to schemes supported by standards such as HTML5, WebRTC, openWebRTC, and MPEG-DASH. However, in order to process video on a web browser using a Real-time Transport Protocol (RTP) and a Real Time Streaming Protocol (RTSP) which have been widely used as standards for transmitting and receiving video, it is necessary to use a plug-in and it is impossible to process video in accordance with the RTP/RTSP on a web browser without a plug-in. However, in an embedded system restricted by system resources such as a network camera or a storage device, it may be practically difficult to additionally install a heavy protocol other than RTP/RTSP.

Therefore, in technical fields such as a network camera, NVR/DVR, encoder/decoder, and video management software, there is a need to devise a technique capable of streaming media (video and audio) on a web browser using an RTP/RTSP communication scheme without a separate plug-in.

SUMMARY

Exemplary embodiments address at least the above problems and/or disadvantages and other disadvantages not described above. Also, exemplary embodiments are not required to overcome the disadvantages described above, and an exemplary embodiment may not overcome any of the problems described above.

One or more exemplary embodiments provide a technique for streaming video and audio on a web browser, capable of achieving streaming without delay using only minimal system specifications without installing a plug-in.

According to an aspect of an exemplary embodiment, there is provided a media stream playing apparatus comprising at least one processor to implement: a transmission module configured to establish a communication connection at a transport layer level with a media service device; a websocket module configured to establish a websocket connection with the media service device based on the communication connection, and transmit or receive websocket packets to or from the media service device while maintaining the websocket connection; a streaming module configured to receive Real-time Transport Protocol (RTP) packets carried by the websocket packets; and a media decoder configured to decode a media stream obtained from the RTP packets to reconstruct video for displaying through a web browser.

According to an aspect of another exemplary embodiment, there is provided a media service device comprising at least one processor to implement: a media server configured to convert a real-time live video or stored video into Real-time Transport Protocol (RTP) packets; and a web server configured to establish a connection with a media stream playing apparatus, and transmit the RTP packets over a websocket protocol to a media stream playing apparatus in response to a request from the media stream playing apparatus.

According to an aspect of another exemplary embodiment, there is provided a media service method comprising: converting a real-time live video or stored video into Real-time Transport Protocol (RTP) packets; establishing a connection with a media stream playing apparatus; and transmitting the RTP packets over a websocket protocol to a media stream playing apparatus in response to a request from the media stream playing apparatus.

BRIEF DESCRIPTION OF DRAWINGS

The above and/or other aspects and features will become more apparent from the following detailed description of the exemplary embodiments, taken in conjunction with the accompanying drawings, in which:

FIG. 6 shows a detailed structural diagram of websocket packets which are transmitted and received between the media stream playing apparatus and a media service unit;

DETAILED DESCRIPTION OF EXEMPLARY EMBODIMENTS

Figure 1:
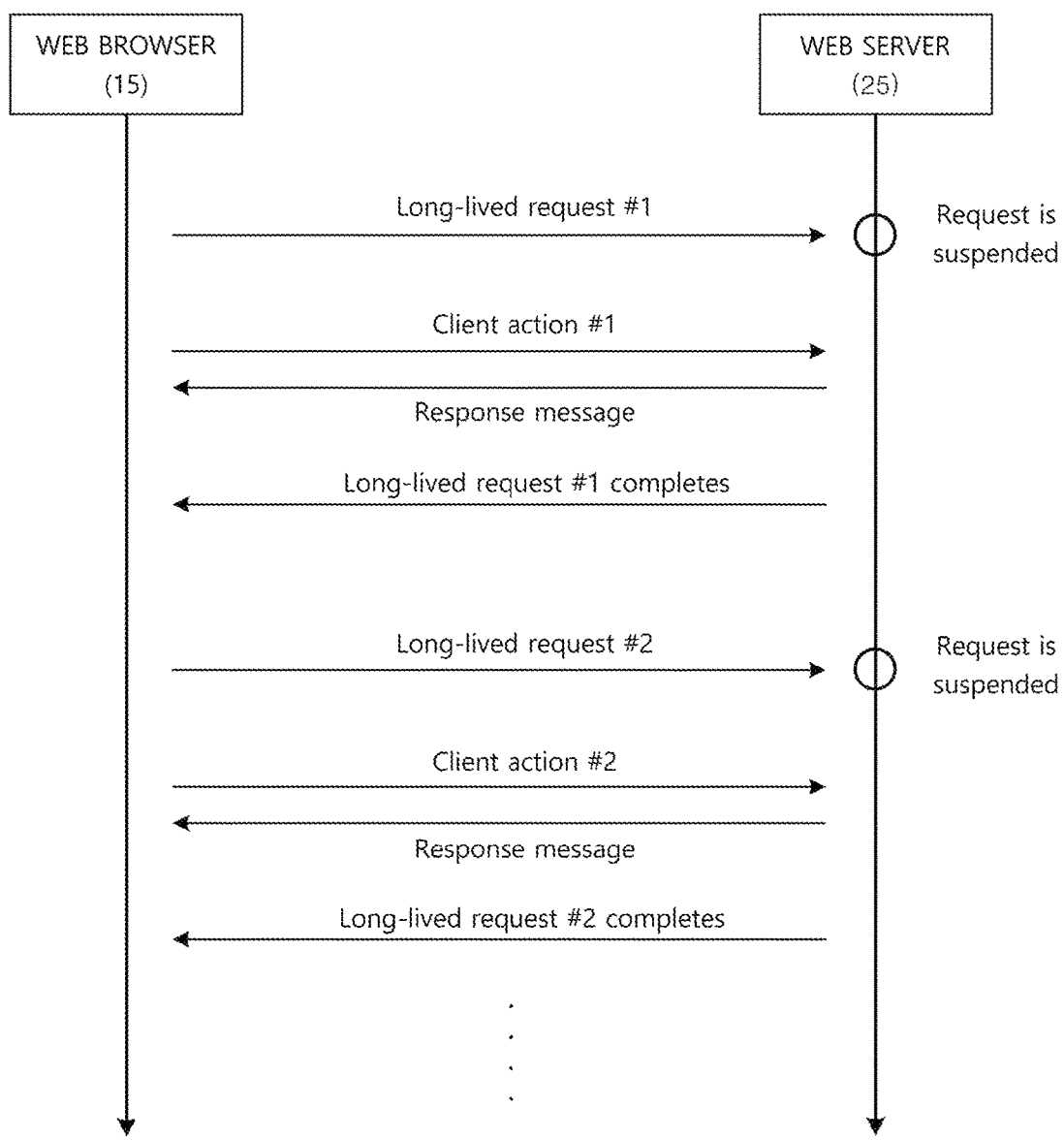
FIG. 1 shows a communication scheme between a web server and a web browser using a conventional HTTP connection method.

Hereinafter, various exemplary embodiments will be described in detail with reference to the accompanying drawings. The matters defined in the description, such as detailed construction and elements, are provided to assist in a comprehensive understanding of the exemplary embodiments. Thus, it is apparent that the exemplary embodiments can be carried out without those specifically defined matters. Throughout the specification, like reference numerals refer to like elements.

Figure 2:
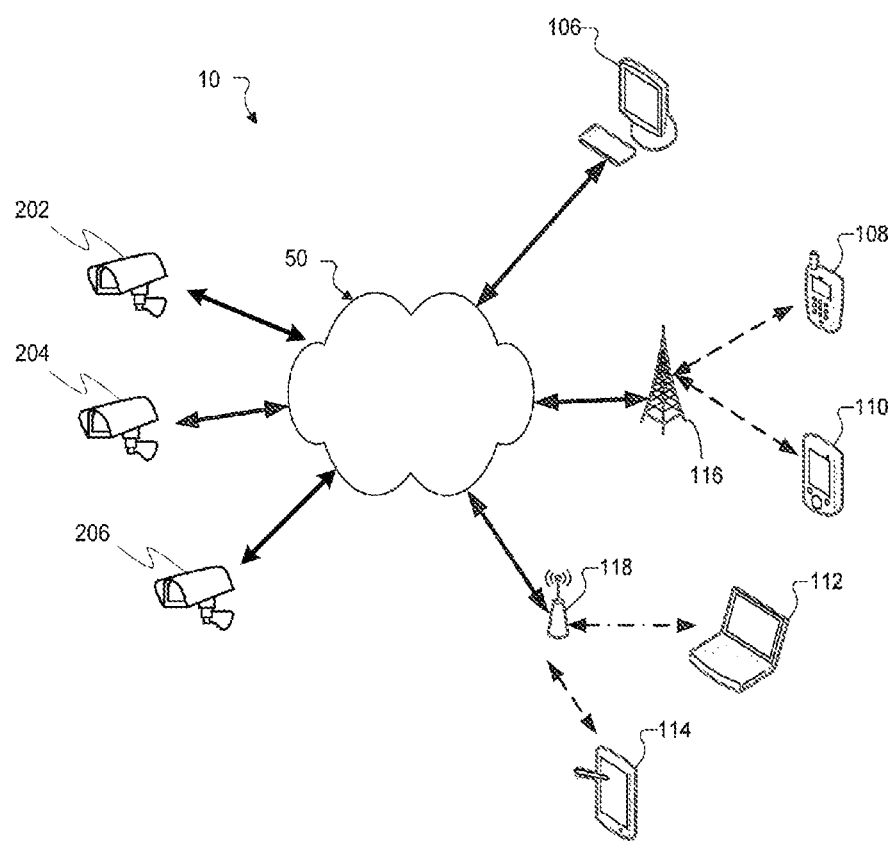
FIG. 2 illustrates an overall system according to an exemplary embodiment.

FIG. 2 illustrates an overall system according to an exemplary embodiment.

Referring to FIG. 2, a system 10 according to an exemplary embodiment includes a network 50 that enables communication between various client user devices 106 to 114, and media service units 202, 204 and 206. The network 50 may include a direct or indirect physical communication connection, a mobile connection network, the Internet, an intranet, a Local Area Network (LAN), a Wide Area Network (WAN), a Storage Area Network (SAN) and other forms for connecting two or more other systems. Each of the media service units 202, 204 and 206 includes a computing or processing device suitable for providing computing services to one or more client user devices and media stream playing apparatuses. For example, the media service units 202, 204 and 206 may include devices, such as a network camera, a network video recorder (NVR), and a digital video recorder (DVR), which may create or store a media stream and transmit the media stream to the client user devices. Each of the client user devices 106 to 114 includes a computing or processing device suitable for interacting with the media service units 202, 204 and 206 or other computing user devices via the network 50. For example, the client user devices 106 to 114 may include a desktop computer 106, a mobile phone or smart phone 108, a personal digital assistant (PDA) 110, a laptop computer 112, and a tablet computer 114. However, additional client user devices may further be included in the system 10. The media service units 202, 204 and 206 or the client user devices 106 to 114 may include, for example, at least one controller for processing commands, at least one memory for storing commands and data, and at least one network interface that enables communication via the network 50.

Here, some client user devices 108 to 114 communicate indirectly with the network 50. For example, the client user devices 108 and 110 communicate with at least one base station 116 based on the cell network. Further, the client user devices 112 and 114 perform communication via at least one wireless access point 118 such as an IEEE 802.11 wireless router. The above descriptions are exemplary and each client user device may communicate with the network 50 directly or indirectly via an appropriate intermediate client user device or network. The network 50 enables efficient media streaming. One or more media service units 202, 204 and 206 may support media streaming over websockets. One or more client user devices 106 to 114 may detect when the media service units 202, 204 and 206 support media streaming over websockets. When the media service units 202, 204 and 206 support media streaming over websockets, one or more client user devices 106 to 114 may establish a websocket connection in the media service units 202, 204 and 206, and send an initial request indicating a selected media target and a location in the stream. Each of the client user devices 106 to 114 sequentially receives segments of media streams provided from the media service units 202, 204 and 206.

Figure 3:
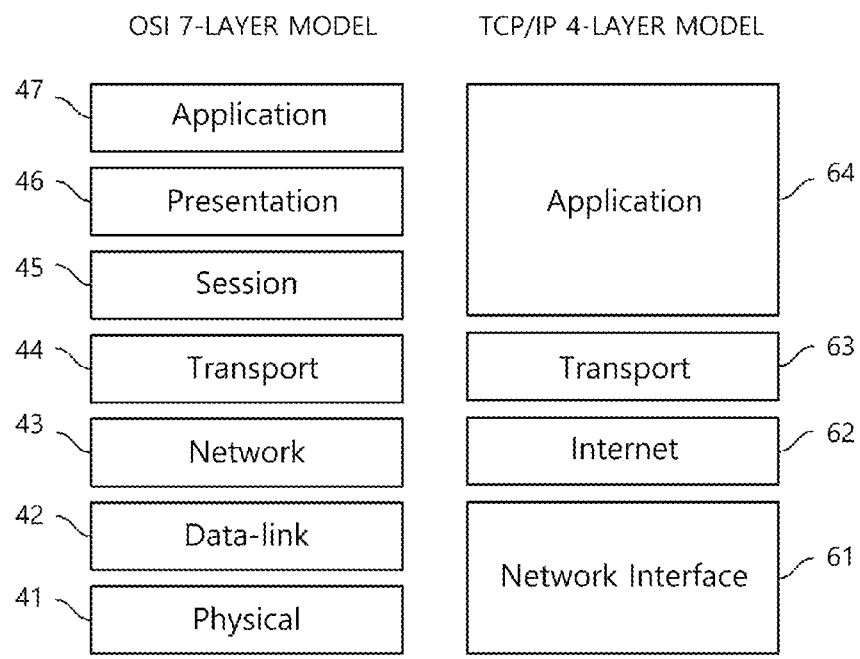
FIG. 3 shows an Open System Interconnection (OSI) 7-layer model and a Transmission Control Protocol/Internet Protocol (TCP/IP) 4-layer model defining hierarchical architectures for communication between devices.

For communication between the client user devices 106 to 114 and the media service units 202, 204 and 206 as shown in FIG. 2, it is necessary to provide each network interface and additional modules for exchanging data with other network interfaces. FIG. 3 shows an Open System Interconnection (OSI) 7-layer model and a Transmission Control Protocol/Internet Protocol (TCP/IP) 4-layer model defining hierarchical architectures for communication between the devices.

The TCP/IP model is a more simplified model than a classical OSI model (7 layers) for explaining a connection process in the network, and classifies the connection process into four layers. The four layers are a network interface layer 61, an Internet layer 62, a transport layer 63 and an application layer 64. Each layer of the TCP/IP model is associated with the OSI model in terms of similar functions and roles. For example, the network interface layer 61 corresponds to a physical layer 41 and a data link layer 42 of the OSI model. The Internet layer 62 corresponds to a network layer 43 of the OSI model, and the transport layer 63 corresponds to a transport layer 44 of the OSI model. Further, the application layer 64 corresponds to a group including a session layer 45, a presentation layer 46 and an application layer 47 of the OSI model. The TCP/IP model is specifically defined in the Request for Comments (RFC) 1122 document.

In the TCP/IP model, the network interface layer 61 interfaces with a physical connection medium to implement Long-Term Evolution (LTE), 802.11(WLAN), 802.3 (Ethernet) or any other appropriate protocol. The Internet layer 62 provides services for user devices to connect the Internet layers in the LAN or WAN. The Internet layer 62 may implement IPv4, IPv6 or any other appropriate protocol.

The transport layer 63 is used to establish an end-to-end connection between user devices. As typical examples of the transport protocol, TCP and UDP (User Datagram Protocol) may be mentioned. Further, the application layer 64 generally implements a communication protocol such as HTTP, RTP and FTP (File Transfer Protocol). HTTP is used to reliably distribute contents such as VOD, RTP is used for real-time content streaming, and FTP is used to asynchronously transmit the mass storage data. As used herein, the term "real-time" means playing media in a media stream playing apparatus while minimizing a time difference between the media service unit and the media stream playing apparatus.

Figure 4:
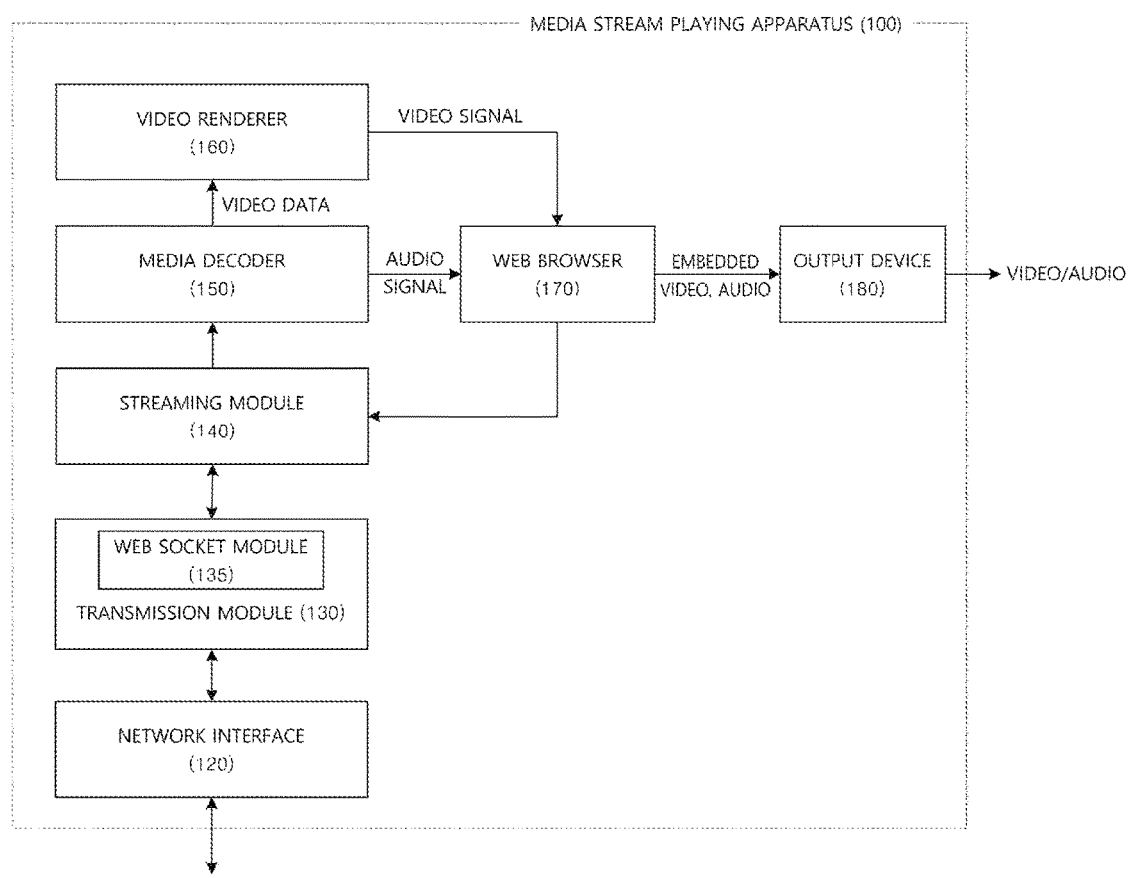
FIG. 4 is a block diagram showing a configuration of a media stream playing apparatus according to an exemplary embodiment.

FIG. 4 is a block diagram showing a configuration of a media stream playing apparatus 100 according to an exemplary embodiment. The media stream playing apparatus 100 may be implemented by any one among the client user devices in FIG. 2, receive a media stream transmitted from the media service unit, and play the media stream on a web browser. The media stream playing apparatus 100 may be configured to include a network interface 120, a transmission module 130, a websocket module 135, a streaming module 140, a media decoder 150, a video renderer 160, a web browser 170 and an output device 180. The web browser 170 may be an application having a level similar to an operating system (OS) (not shown) embedded in the media stream playing apparatus 100. Further, the streaming module 140, the media decoder 150 and the video renderer 160 are, for example, Java applications which are implemented by JavaScript and hosted by the web browser 170 and the operating system. Further, the network interface 120, the transmission module 130 and the websocket module 135 belong to a communication module for network communication, and correspond to an operating system (OS) kernel in terms of device implementation.

Referring to FIG. 4, the network interface 120 interfaces with a physical connection medium for data transmission and reception between the media stream playing apparatus 100 and a media service unit 200. The network interface 120 corresponds to the network interface layer 61 in the TCP/IP model of FIG. 3. The physical connection medium used in the network interface 120 may include a wireless medium such as Long-Term Evolution (LTE), 802.11 (WLAN) and 802.15.3 (WPAN) and a wired medium such as 802.3 (Ethernet).

The transmission module 130 performs a transmission control for transmitting and receiving data between the media stream playing apparatus 100 and the media service unit 200 and corresponds to the transport layer 63 in the TCP/IP model of FIG. 3. The transmission module 130 establishes a communication connection at a transport layer level between the media stream playing apparatus 100 and the media service unit 200, and serves to sequentially transmit data packets and recover transmission errors for stable data transmission and reception. The transmission module 130 supports a TCP or UDP protocol to ensure a websocket connection at a transport layer level between the media stream playing apparatus 100 and the media service unit 200. TCP is a protocol for reliably distributing contents in a connection-oriented mode, and UDP is a protocol for continuously distributing contents with a low overhead. For example, as a websocket protocol, TCP may be used for stable transmission, but UDP may be used for low overhead transmission.

The websocket module 135 establishes a websocket connection via a handshake procedure with the media service unit 200 based on the connection at the transport layer level, and transmits/receives websocket packets to/from the media service unit 200 while continuously maintaining the established websocket connection. The websocket module 135 may be implemented in the transmission module 130, and may be implemented at a higher level than the transmission module 130 separately from the transmission module 130.

The websocket is a protocol that provides a two-way, full-duplex communication channel through a TCP connection by improving conventional half-duplex HTTP communication. The websocket protocol has been standardized as RFC6455 by an Internet Engineering Task Force (IETF) standard organization. However, the standardized websocket protocol has been intended as a general protocol, and lacks the extended functions desired by the user. The protocol is allowed to be extended by JavaScript or the like in the web browser in order to support new functions.

Because the websocket connection is located at a higher level than the existing transport layer (TCP or UDP) connection between two devices, in order to use the websocket connection, a TCP transport connection should be first established between two devices. Once a websocket connection is established between the media stream playing apparatus 100 and the media service unit 200 via, for example, a three-way handshake procedure, websocket communication is performed by transmitting websocket packets.

Figure 5:
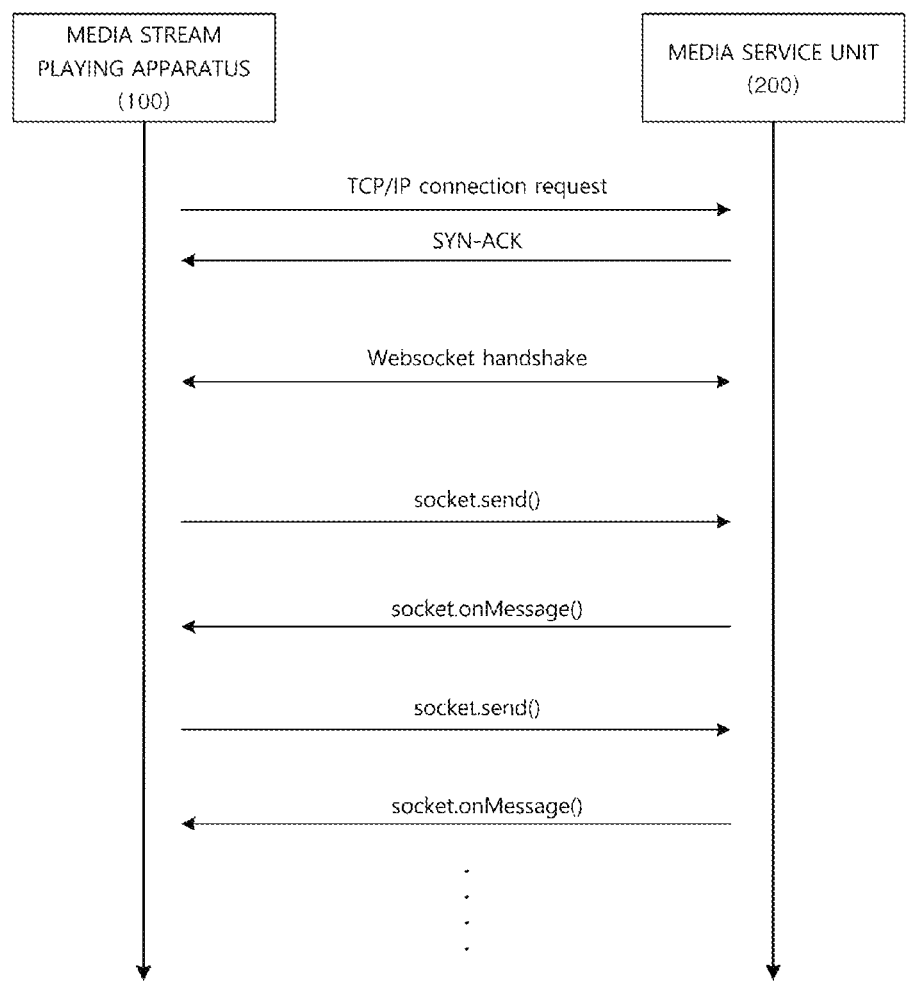
FIG. 5 is a sequence diagram showing an example of transmitting and receiving data through a websocket connection.

FIG. 5 shows an example of transmitting and receiving data through a websocket connection. The websocket connection is performed according to a websocket protocol that is the HTML5 standard. In particular, because the websocket connection continuously supports two-way communication, it is possible to continuously transmit and receive data without disconnection between a web server of a network camera and a web browser of a user terminal device.

Referring to FIG. 5, the media stream playing apparatus 100 sends a TCP/IP connection request message to the media service unit 200. When the media service unit 200 accepts the connection request and transmits a TCP response message (SYN-ACK) to the media stream playing apparatus 100, a TCP/IP connection is established. A TCP transport connection may be formed by a pair of a local TCP socket and a remote TCP socket, and each TCP socket is defined by at least an identifier such as a port number and IP address. Alternatively, a UDP/IP-based connection may be established between the media stream playing apparatus 100 and the media service unit 200.

Thereafter, when a web socket connection is established between the media stream playing apparatus 100 and the media service unit 200 via a handshake procedure, data transmission and reception between them can be continuously performed. That is, the media stream playing apparatus 100 sends a media streaming request in the form of transport websocket packets (socket.send) to the media service unit 200, and the media service unit 200 sends a media stream in the form of response websocket packets (socket.onMessage) to the media stream playing apparatus 100. This process may be performed continuously between the media stream playing apparatus 100 and the media service unit 200 until the media stream transmission is stopped or completed.

FIG. 6 illustrates a detailed structure of websocket packets which are transmitted and received between the media stream playing apparatus 100 and the media service unit 200. A start portion of the websocket packets may include metadata information related to the data configuration contained in the websocket packets, and an end portion of the websocket packets may include actual payload data (application-level data). The location of the payload data in the websocket packets varies depending on the size of the payload data and whether a masking key is used. The websocket packets are basic units of communication data to be framed in websocket communication. By default, the websocket protocol may use fixed port 80, but is not limited thereto. For example, for websocket connection to be tunneled through transport level security (TLS), port 443 may be used.

In the TCP/IP model of FIG. 3, the websocket protocol is located between the application layer 64 and the transport layer 63. That is, the websocket protocol is located between the TCP or UDP belonging to the transport layer 63 and the RTP/RTSP belonging to the application layer 64. By default, the transmission module 130 of FIG. 4 has a structure in which a websocket protocol is stacked on a conventional transport layer protocol such as TCP or UDP.

The websocket communication provides full-duplex communication to at least the application of the higher level, and improves communication between the web browser and the web server by reducing an overhead while maintaining the connection of TCP or UDP transport of the lower level. Unlike half-duplex communication using HTTP, which selectively performs transmission and reception between a client device and a server device, the websocket communication is full-duplex communication and performs transmission and reception simultaneously. In addition, when communication is performed over websockets, less header information is transmitted per unit message to reduce an overhead during transmission. Further, without having to exchange HTTP request and response messages for polling of a second device from a first device, it is possible to maintain a lower TCP layer connection between the first device and the second device.

Referring again to FIG. 4, when TCP/IP (or UDP/IP) and websocket connections are established in the transmission module 130, the websocket packets can be continuously transmitted and received between the media stream playing apparatus 100 and the media service unit 200. The transmission module 130 receives the media stream packetized in the form of websocket packets transmitted from the media service unit 200 and transmits it to the streaming module 140, or packetizes the command transmitted from the streaming module 140 in the form of websocket packets and transmits it to the media service unit 200.

The streaming module 140 requests the media service unit 200 to transmit the media stream via a real-time transport protocol in response to a request of the web browser 170. The streaming module 140 controls the playback of the media stream according to a real-time transport protocol while receiving real-time transport protocol packets including the media stream from the media service unit 200.

The streaming module 140 may use, for example, a Real time Transport Protocol (RTP) and a Real Time Steaming Protocol (RTSP). RTP is a protocol such as MJPEG, MPEG-4, H.264 and H.265 as the standard for transmitting real-time or stored video.

Figure 7:
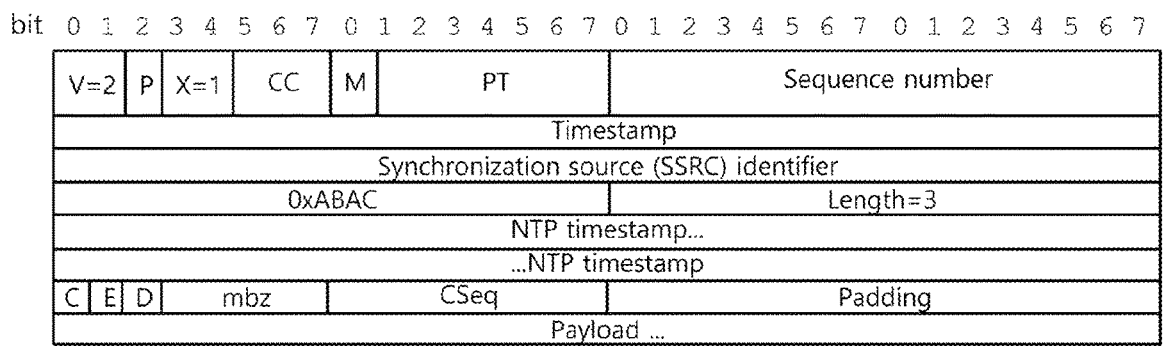
FIG. 7 is a detailed structural diagram of an RTP protocol.

FIG. 7 illustrates a detailed data structure of the RTP protocol. The RTP protocol is divided into a header and a payload. The header includes a sequence number indicating the transmission order of RTP data packets, a time stamp for synchronization of the representation time of the media, a synchronization source identifier (SSRC identifier) indicating a synchronization source for the data stream, and the like. Because the size of the packets of the media stream based on the RTP is limited, the media stream may be transmitted while being divided into a predetermined size (e.g., 1.5 kByte) (packetization). The divided and transmitted packets are assembled into a single video frame after being received by the streaming module 140 (depacketization). Further, one audio frame may be divided and transmitted similarly, but one audio frame may be transmitted per packet because the amount of data of the audio frame is smaller than that of the video frame.

RTSP is a protocol for setting a network port between the media service unit 200 (e.g., a network camera) and the media stream playing apparatus 100 in order to receive real-time or stored video and controlling commands (e.g., Play, Pause, Teardown, Setup, Option, Describe, etc.) associated with the playback. Among them, "Play" is a command used to start the media stream, "Pause" is a command used to temporarily stop the started media stream, and "Teardown" is a command used to tear down or destroy a particular media session. In addition, "Setup" is a command used to set up media session parameters, "Option" is a command used to obtain an option method function and allow another version later, and "Describe" is a command used to obtain media parameters using a specified profile.

As described above, the RTP protocol is a protocol for actual transmission by packetizing the media stream, while the RTSP protocol is a protocol for starting/ending the transmission or controlling the playback of the media stream being already transmitted.

Figure 8:
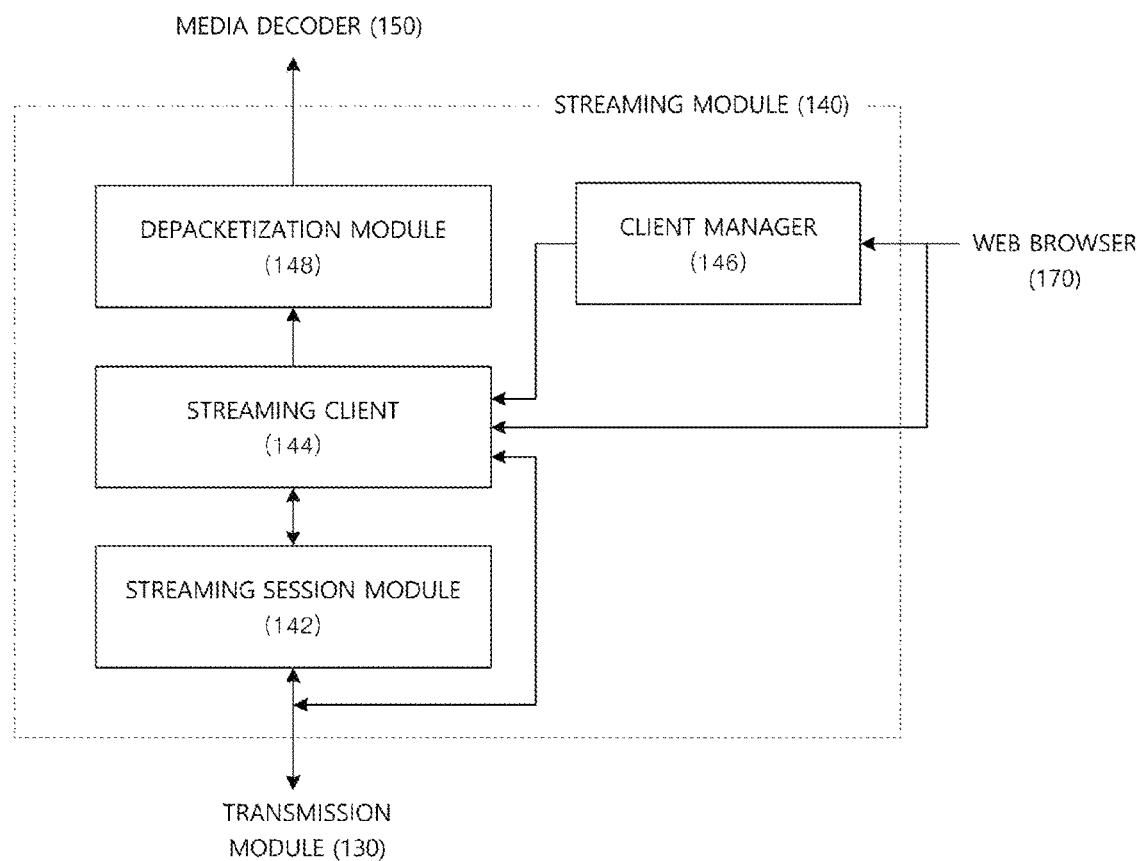
FIG. 8 is a block diagram showing a detailed configuration of a streaming module of FIG. 4.

The streaming module 140 may be configured to include, as shown in FIG. 8, a streaming session module 142, a streaming client 144, a client manager 146 and a depacketization module 148. Because each of the components 142, 144, 146 and 148 constituting the streaming module 140 is programmed by JavaScript supported by the HTML5 standard, there is no need for a separate plug-in for implementing the function of the streaming module 140 on the web browser 170.

The streaming session module 142 forms a session with the media service unit 200 to reliably receive the media stream being transmitted via the real-time transport protocol. Accordingly, the transmission module 130 may serve as a port for receiving the transmitted media stream or transmitting a playback control command transmitted from the media stream playing apparatus 100.

The streaming client 144 creates a new client module for controlling the streaming in response to a request of the client manager 146, or ends the created client module. Further, the streaming client 144 receives a connection command with the media service unit 200 requested from the web browser 170 or receives a playback command of the media stream from the web browser 170, packetizes the command, allows the transmission module 130 to transmit the packetized command to the media service unit 200, and receives a response (media stream) transmitted from the media service unit 200 via the transmission module 130. While the streaming client 144 receives and processes the RTP packets from the websocket module 135 in the transmission module 130, the received RTP packets are transmitted to the depacketization module 148 for buffering to create a data frame (e.g., video frame or audio frame).

The client manager 146 creates a client module in the streaming client 144 in response to a request of the web browser 170, or removes or destroys the created client module. That is, the client manager 146 serves to create and terminate the client module for the operation of the streaming client 144.

The depacketization module 148, if the media stream is transmitted as divided packets from the streaming client 144, sequentially stores the divided packets in a buffer (not shown) and assembles the divided packets into one complete frame (depacketization). If the media stream is transmitted without being divided into packets, this process may be omitted. Because a video frame forming the video stream is difficult to be transmitted in a single packet due to its size, it is generally divided and transmitted. However, because an audio frame has a relatively small size, it can be transmitted in a single packet.

The video frame and the audio frame created by the streaming module 140 are provided to the media decoder 150. The media decoder 150 includes at least a video decoder for decoding the media stream (particularly, a video frame) encoded in accordance with the video coding standard such as MJPEG, MPEG-4, H.264, and H.265. The media decoder 150 may further include an audio decoder for decoding the media stream (particularly, an audio frame) encoded in accordance with the audio coding standard such as MP3 (MPEG layer-3), G.711, G.726, AC3 (Audio Codec code 3), DTS (Digital Theatre System), FLAC (free lossless audio codec), and AAC (Advanced Audio Coding). The media decoder 150 may include a FFmpeg function, and is programmed by JavaScript supported by the HTML5 standard. Therefore, a separate plug-in is not necessary for the function of the media decoder 150. The FFmpeg is a complete cross-platform solution to provide flexibility capable of converting video and audio and setting various options. For example, the FFmpeg performs various conversions and processes such as a bit rate, a frame rate, the resolution of displayed video, an aspect ratio and cropping on the input video frame. Because the FFmpeg is an example of a video/audio decoder, another video/audio decoder that can also be implemented by JavaScript may be used. The process performed in the media decoder 150 may include transcoding (encoding after decoding) the media stream, but instead, it may include simply converting metadata or headers of the media stream into other formats, such as container generation.

As described above, the media decoder 150 has, by default, a function for decoding the encoded video and audio transmitted from the media stream playing apparatus 100. The media decoder 150 may further include an audio encoder (not shown) for encoding the audio captured by the media stream playing apparatus 100 for two-way audio communication between the media stream playing apparatus 100 and the media service unit 200. Thus, the audio encoded by the media stream playing apparatus 100 may be transmitted to the media service unit 200 and outputted externally as an alarm for a region to be monitored by a capture device 270 in the media service unit 200.

The video data processed and reconstructed in the media decoder 150 is inputted to the video renderer 160 to be converted into a video signal that can be displayed on a display, and the video signal is inputted to the web browser 170. The video renderer 160 may be an application program interface (API) which defines 2D or 3D representation of the video as standards, and include a video processing function such as transparency, anti-aliasing, texture mapping, and pixel manipulation as an independent function of each operating system (OS). As the video renderer 160, Direct Draw, D2D, D3D, OpenGL, GDI+ and the like are well-known, but these require a separate plug-in for implementation. Accordingly, it is preferable to use Web Graphics Library (WebGL) supported in HTML5 without a separate plug-in. The WebGL is a web-based graphic library which can be implemented by JavaScript programming language, and is provided such that interactive 3D graphics can be used in a web browser having compatibility.

Thus, the video signal processed by the video renderer 160 is embedded in the web browser 170, and the embedded video is transmitted to the output device 180 and outputted on the screen as video that can be recognized visually by the user. The web browser 170 may be implemented by Internet Explorer, Chrome, Firefox, Safari, Edge Browser and the like which are well-known, and may be a browser that does not support a plug-in. The output device 180 includes a display device, such as LCD, LED, and OLED, which can represent video.

Meanwhile, the audio signal outputted from the media decoder 150 is provided, as an audio signal that can be played in the web browser 170, to the web browser 170 through, for example, an IO API of the HTML5 standard. Thus, the audio which is embedded in the web browser 170 synchronously with the video is outputted finally through the output device 180 so that the user can recognize by hearing. The output device 180 may include an audio output device such as an audio receiver, an amplifier, and a speaker.

Figure 9:
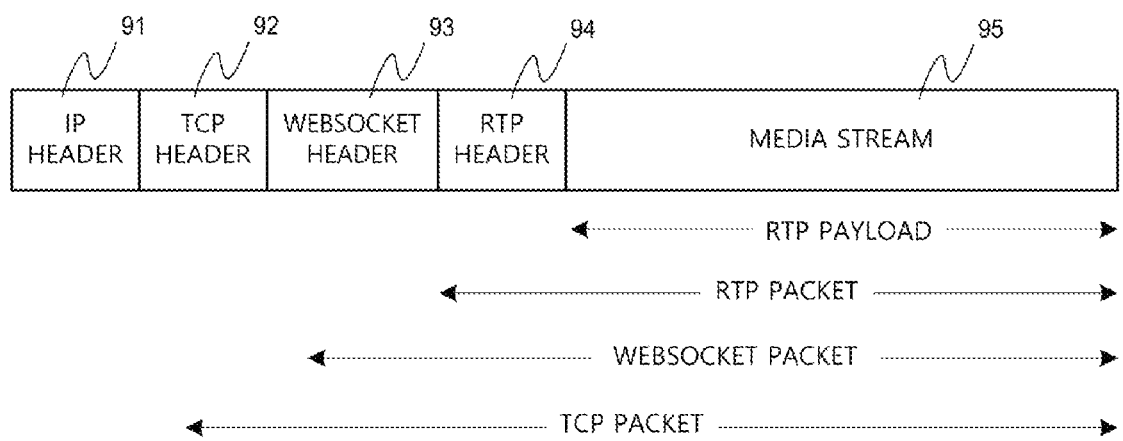
FIG. 9 illustrates a structure of a communication packet for communication with the media service unit via a network interface.

FIG. 9 illustrates a structure of a communication packet for communication with the media service unit 200 via the network interface 120. When an RTP header 94 is added to an RTP payload corresponding to a media stream 95, it becomes an RTP packet. The RTP packet is the same as a websocket payload, and a websocket header 93 is added to the websocket payload to produce a websocket packet. The websocket packet is the same as a TCP payload, and a TCP header 92 is added to the TCP payload to produce a TCP packet. Finally, the TCP packet is the same as an IP payload, and an IP header 91 is added to the IP payload to finally produce a communication packet, i.e., IP packet. Thus, a process of completing the IP packet and a process of removing each header are performed in the media stream playing apparatus 100 and the media service unit 200.

When the IP packet is received via the network interface 120, the IP header 91 and the TCP header 92 are processed in the transmission module 130, and the TCP payload or the websocket packet is transmitted to the websocket module 135. The websocket module 135 transmits the RTP packet generated by processing the websocket header 93 from the websocket packet to the streaming module 140. The streaming module 140 restores the media stream by processing the RTP header 94 in the RTP packet. As used herein, a TCP has been illustrated as a lower protocol for transmitting the websocket packet, but UDP or HTTP tunneling may be used instead of the TCP. Further, it has been described that the RTP packet becomes a websocket payload, but the RTSP packet may become a websocket payload.

In the media stream playing apparatus 100 shown in FIG. 4, because communication between the media stream playing apparatus 100 and the media service unit 200 is performed via a HTML5-based websocket protocol, the streaming module 140 responsible for RTP/RTSP transmission and reception control, the media decoder 150 responsible for decoding of video/audio, and the video renderer 160 responsible for display processing of the decoded video may be implemented by JavaScript codes supported in HTML5. Thus, real-time streaming and playing of media can be implemented in the web browser without separately installing a plug-in such as NPAPI or Active X as in a conventional case.

When the websocket program for RTSP control is implemented by JavaScript according to an exemplary embodiment, for example, the following pseudo codes can be expressed.

```
var META = 0,
    VIDEO = 1,
    AUDIO = 2,
    AUDIO_BACKUP = 3,
    RTCP_VIDEO = 4;
RTCP_AUDIO = 5;
RTCP_META = 6;
var RtspClient = function ( ) {
// RTSP Client
// RTSP Command Parsing
// OPTIONS, TEARDOWN, GET_PARAMETERS,
SET_PARAMETERS, DESCRIBE,
SETUP, PLAY, STOP
    var CommandConstructor = function (method, requestURL,
    extHeader) {
      switch (method) {
        case 'OPTIONS':
    // OPTIONS Reaction
        case 'TEARDOWN':
    // TEARDOWN Reaction
        case 'GET_PARAMETER':
    // GET_PARAMETER Reaction
        case 'SET_PARAMETERS':
    // SET_PARAMETERS Reaction
        case 'DESCRIBE':
    // DESCRIBE Reaction
        case 'SETUP':
```

```
// SETUP Reaction
    case 'PLAY':
// PLAY Reaction
    case 'PAUSE':
// PAUSE Reaction
    default:
      break;
    }
    isReceive = false;
    return sendMessage;
};
  var parseDescribeResponse = function (message1) {
// DESCRIBE Operation
// SDP Parsing
    return SDPData;
  }
  var parseRtspResponse = function (message1) {
// RTSP Response Operation
// Error or OK
    return RtspResponseData;
}
  var formDigestAuthHeader = function (stringMessage, method) {
// Authentication
  };
  var RtspResponseHandler = function (stringMessage) {
// RTSP Response Handler
// Error Code Handling
  };
  var RtpDataHandler = function (rtspinterleave, rtpheader,
    rtpPacketArray) {
// RTP Data Handling
// Depacketization
};
  var connectionCbFunc = function (type, message) {
// Connection Callback
  };
  module.SetMetaCallback = function (metaCallbackFunc) {
// Metadata Callback
  };
  module.SetH264VideoCallback = function (videoCallbackFunc) {
// H.264 Callback
  };
  module.SetH265VideoCallback = function (videoCallbackFunc) {
// H.265 Callback
  };
  module.SetMjpegVideoCallback = function (videoCallbackFunc) {
// MJPEG Callback
  };
  module.SetG711AudioCallback = function (audioCallbackFunc) {
// G.711 Audio Callback
  };
  module.SetG726AudioCallback = function (audioCallbackFunc) {
// G.726 Audio Callback
  };
  module.SetAACAudioCallback = function (audioCallbackFunc) {
// AAC Audio Callback
  };
  ...
  return module;
};
```

Figure 10:
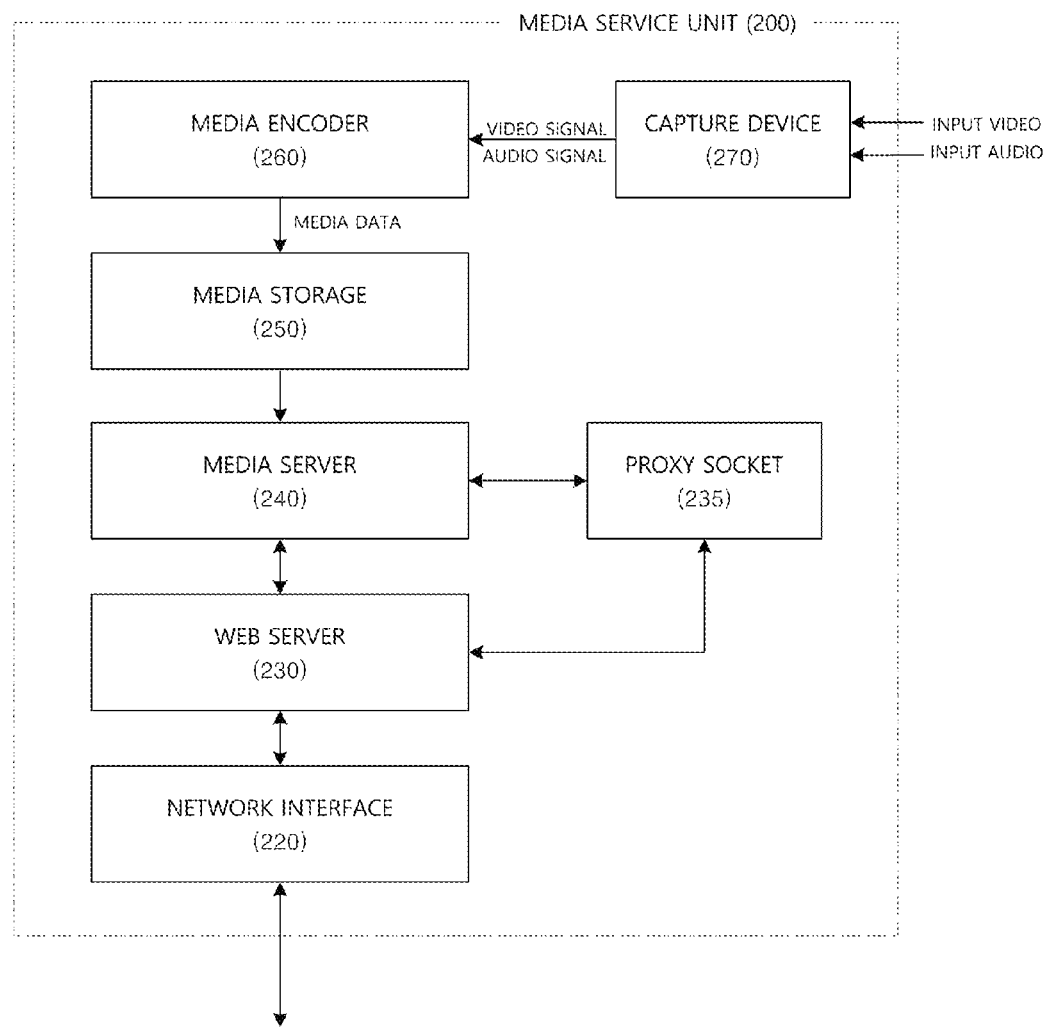
FIG. 10 is a block diagram showing a configuration of the media service unit communicating with the media stream playing apparatus of FIG. 3.

FIG. 10 is a block diagram showing a configuration of the media service unit 200 communicating with the media stream playing apparatus 100 of FIG. 3. The media service unit 200 may include a network interface 220, a web server 230, a media server 240, and a media storage 250. The media service unit 200 may further include a media encoder 260 and the capture device 270.

The capture device 270 converts input video and audio into electrical signals (analog or digital signals) to generate a video signal and an audio signal, and transmits the generated video signal and audio signal to the media encoder 260. The media encoder 260 serving as an element corresponding to the media decoder 150 includes at least a video encoder for encoding the input video signal according to the video coding standard such as MJPEG, MPEG-4, H.264, and H.265. The media encoder 260 may further include an audio encoder for encoding the input audio signal according to the audio coding standard such as MP3, G.711, G.726, AC3, DTS, FLAG, and AAC.

Through this process, the encoded media or media stream generated in the media encoder 260 is stored in the media storage 250. The media storage 250 may store both volatile and non-volatile media, and various physical types of media such as magnetic storage media, optical storage media, a hard disk drive (HDD), a Solid State Drive (SSD) and a flash memory. The media storage 250 may store the media stream generated by the media encoder 260 for long-term storage, or temporarily store the media stream for the purpose of supporting the streaming of the media server 240.

The media server 240 converts the media stream provided from the media storage 250 into the form of a media stream that can be transmitted over the network. The media server 240 supports the RTP/RTSP protocols. For example, based on the RTSP packets transmitted from the media stream playing apparatus 100, the media server 240 generates the RTP packets and controls the transmission of the RTP packets to the media stream playing apparatus 100. The RTP packets may be configured as shown in FIG. 6.

The web server 230 hosts web contents acquired by the media stream playing apparatus 100. In this case, any kind of data and services may be provided by the web server 230. Accordingly, the web browser 170 of the media stream playing apparatus 100 may access the services or contents provided at least partially by the web server 230. The web server 230 may process the connection and request of the media stream playing apparatus 100 by using the websocket protocol.

The web server 230 transmits the media stream (RTP packets generated by the media server 240) based on websockets to the media stream playing apparatus 100. To this end, the web server 230 supports a websocket protocol that is the HTML5-based two-way communication technology standard, and TCP/IP (or UDP/IP) that is a lower protocol for sending the websocket packets (shown in FIG. 7) according to the websocket protocol. The web server 230 may be of any type by default, but it is preferable to use a type which requires less resources and have a small capacity, such as lighttpd, in consideration of the environment such as a network camera in which it is difficult to have high specifications.

Meanwhile, a proxy socket 235 may be additionally disposed between the media server 240 and the web server 230. When a websocket connection is established between the web server 230 and the web browser 170 of the media stream playing apparatus 100, the web server 230 transmits the websocket connection to the proxy socket 235. In this case, the proxy socket 235 relays data transmission and reception between the media server 240 and the web server 230 through a predetermined socket regardless of its connection method. Thus, by using the proxy socket 235, the media server 240 may transmit and receive the data through a fixed socket module regardless of whether the connection is made by UDP, TCP, WS/TCP (TCP-based websocket) or WS/UDP (UDP-based websocket), or the type of the connection port.

By default, because the websocket is based on HTTP of TCP connection, the proxy socket 235 may be based on the TCP socket. To this end, the proxy socket 235 has a function of encoding the communication data transmitted by the media service unit 200 into websocket packets to be transmitted to the media stream playing apparatus 100, and decoding the websocket packets received from the media stream playing apparatus 100 in a data format desired by the media service unit 200.

The network interface 220 corresponds to the network interface 120 of the media stream playing apparatus 100, and interfaces with a physical connection medium for transmission/reception of data to/from the media stream playing apparatus 100. The network interface 220 corresponds to the network interface layer 61 in the TCP/IP model of FIG. 3. The physical connection medium used in the network interface 220 includes a wireless medium such as Long-Term Evolution (LTE), 802.11 (WLAN) and 802.15.3 (WPAN) and a wired medium such as 802.3 (Ethernet).

Each component described above with reference to FIGS. 4, 8 and 10 may be implemented as a software component, such as a task performed in a predetermined region of a memory, a class, a subroutine, a process, an object, an execution thread or a program, or a hardware component, such as a Field Programmable Gate Array (FPGA) or Application Specific Integrated Circuit (ASIC). In addition, the components may be composed of a combination of the software and hardware components. The components may be reside on a computer readable storage medium or may be distributed over a plurality of computers.

Figure 11:
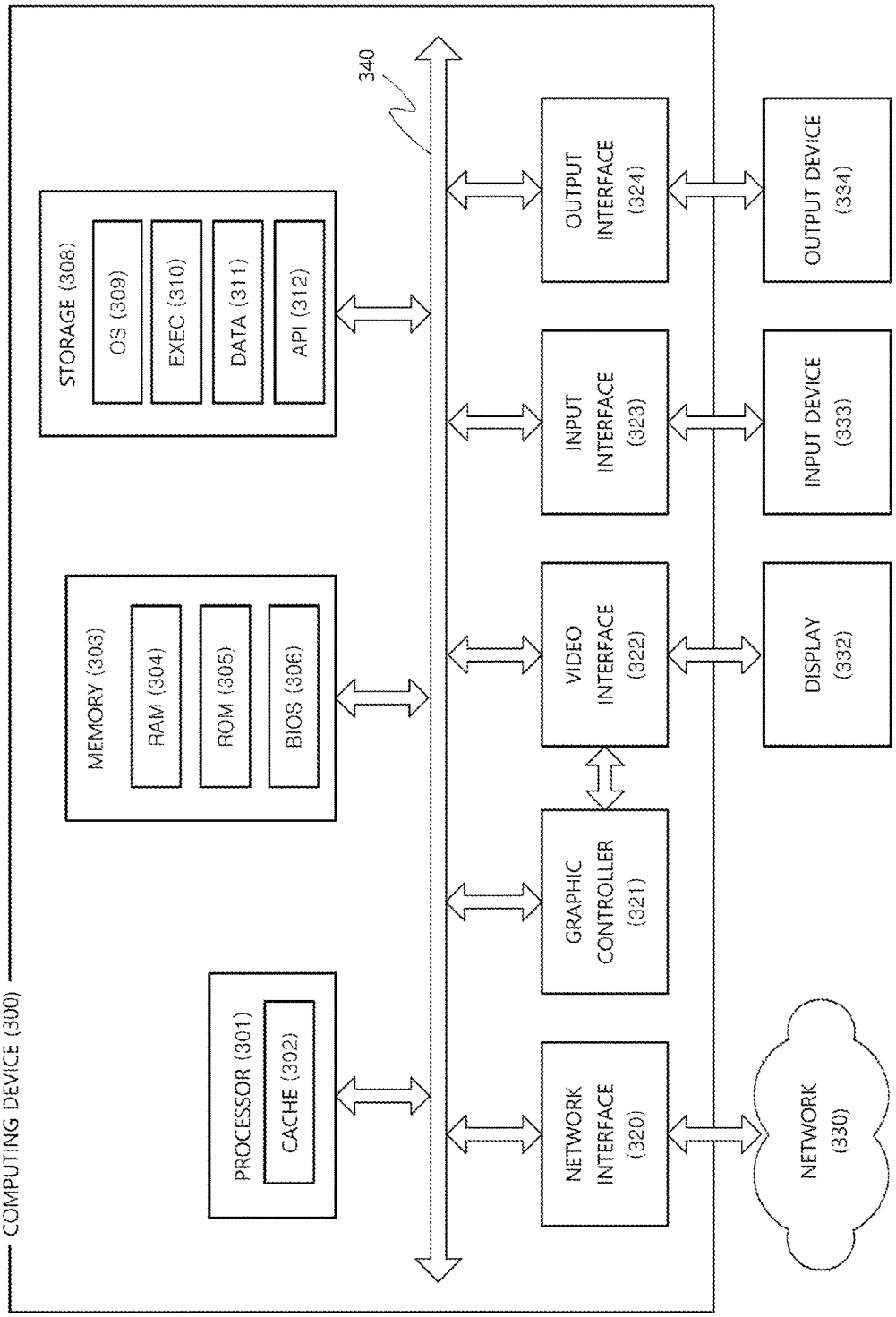
FIG. 11 illustrates a computing device that implements the media stream playing apparatus or the media service unit.

The media stream playing apparatus 100 or the media service unit 200 may be implemented in a computing device 300 described in FIG. 11. Computing device 300 may have any suitable physical form, including but not limited to one or more integrated circuits (ICs), printed circuit boards (PCBs), mobile handheld devices (such as smartphones and tablet computers), laptop or notebook computers, distributed computer systems, computing grids, or servers. Computing device 300 may have a processor 301, a memory 303 and a storage 308. Bus 340 may be connected to a display 332, at least one input devices 333 and at least one output device 334.

The components may be connected to bus 340 directly or via at least one interface and adapters. Bus 340 connects a wide variety of subsystems. Bus 340 may have a memory bus, a memory controller, a peripheral bus, a local bus and combinations thereof.

Processor(s) or CPU(s) 301 optionally contains a cache memory unit 302 for temporary local storage of instructions, data, or computer addresses. Processor(s) 301 executes instructions (or software modules) in a storage media that is readable by a computer. The computer-readable storage media can store some software modules (e.g., 130, 135, 140, 150, 160 and 170 of FIG. 4, and 230, 235, 240, 260 of FIG. 10) that implements specific exemplary embodiments and processor(s) 301 can execute the stored software modules.

The memory 303 may include, but not limited thereto, a random access memory 304, a read-only memory 305, and any combinations thereof. The memory 303 may further include a basic input/output system (BIOS) having basic routines needed to start-up the computing device 300.

Storage 308 may be used to store operating system (OS) 309, EXECs 310 (executables), data 311, API applications 312 (application programs), and the like. Storage 308 can include a hard disk drive, an optical disk drive, a solid-state memory device, or a combination of any of the above.

Computing device 300 may include an input device 333. In one example, a user of computing device 300 may enter commands and/or other information into computing device 300 via input device(s) 333. Examples of an input device(s) 333 include, but are not limited thereto, an alpha-numeric input device (e.g., a keyboard), a pointing device (e.g., a mouse or touchpad), a touchpad, a joystick, a gamepad, an audio input device (e.g., a microphone, a voice response system, etc.), an optical scanner, a video or still camera (e.g., a camera), and any combinations thereof. Input device(s) 333 may be interfaced to bus 340 via any of a variety of input interfaces 323 including, but not limited thereto, serial, parallel, game port, USB, or any combination of the above.

When computing device 300 is connected to network 330, computing device 300 may communicate with other devices, for example, mobile devices and enterprise systems. Communications to and from computing device 300 may be sent through network interface 320. For example, network interface 320 may receive incoming communications (such as requests or responses from other devices) in the form of one or more packets (e.g., IP packets) from network 330, and computing device 300 may store the incoming communications in memory 303 for processing. Computing device 300 may store outgoing communications (such as requests or responses to other devices) in the form of one or more packets in memory 303 and may send the outgoing communications to network 330.

Examples of the network interface 320 may include, but are not limited thereto, a network interface card, a modem, and any combination thereof. Examples of a network 330 or network segment 330 may include, but are not limited thereto, a wide area network (WAN), a local area network (LAN), a telephone network, a direct connection between two computing devices, and any combinations thereof. A network, such as network 330, may employ a wired and/or a wireless mode of communication.

A result of software modules executed by the processor(s) 301 can be displayed through a display 332. Examples of the display 332 may include, but are not limited thereto, a liquid crystal display (LCD), an organic liquid crystal display (OLED), a cathode ray tube (CRT), a plasma display, and any combinations thereof. The display 332 is linked to the bus 340 via a video interface 322, and the graphics control 321 may control transport of data between the display 332 and the bus 340.

Computing device 300 may further include one or more other peripheral output devices 334 including, but not limited thereto, an audio speaker, a printer, and any combinations thereof. Such peripheral output devices may be connected to the bus 340 via an output interface 324. Examples of an output interface 324 may include, but are not limited thereto, a serial port, a parallel connection, a USB port, and any combinations thereof.

Figure 12:
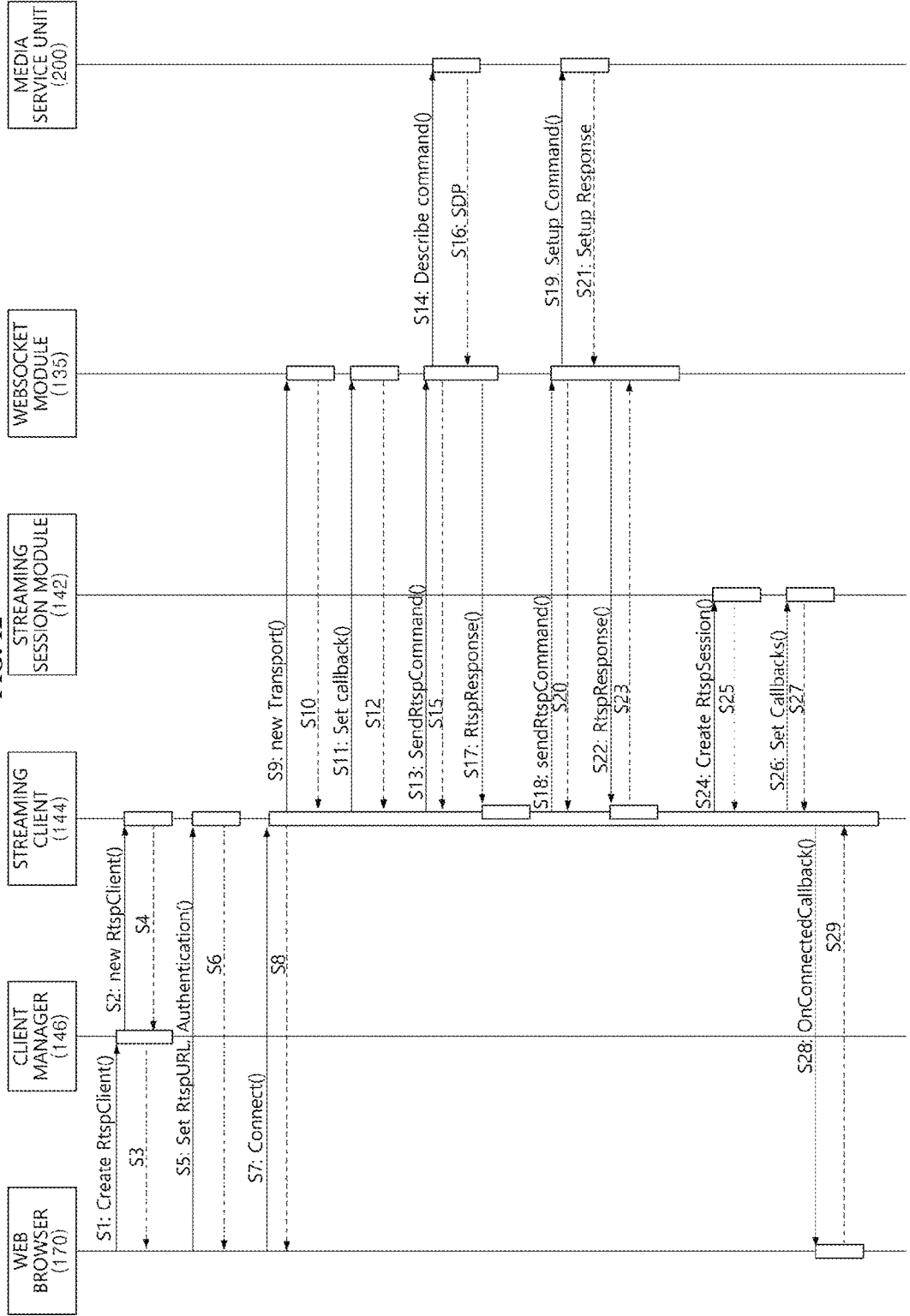
FIG. 12 is a sequence diagram showing an RTSP setup procedure between the streaming module in the media stream playing apparatus and the media service unit.
Figure 13:
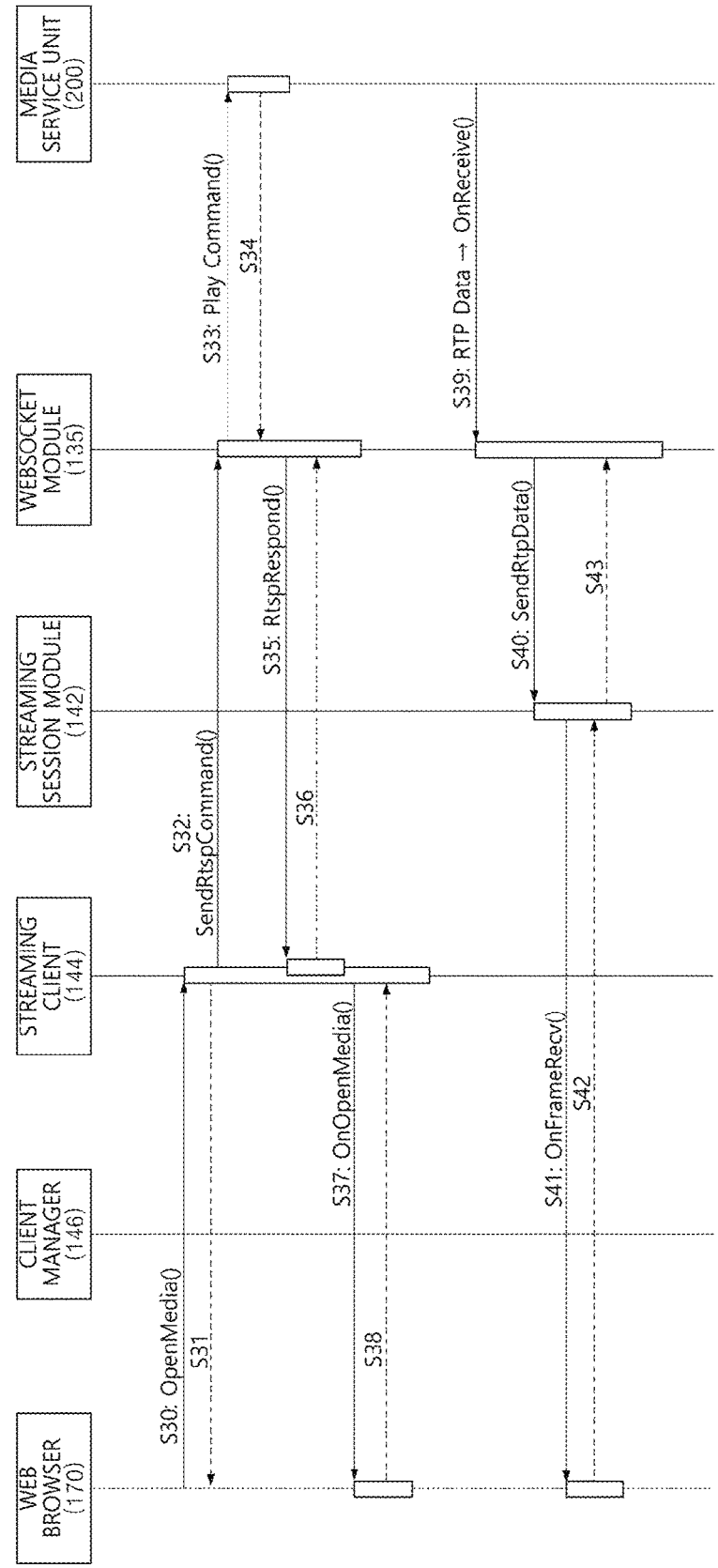
FIG. 13 a sequence diagram showing a process in which the streaming module receives RTP data from the media service unit after the setup procedure of FIG. 12.
Figure 14:
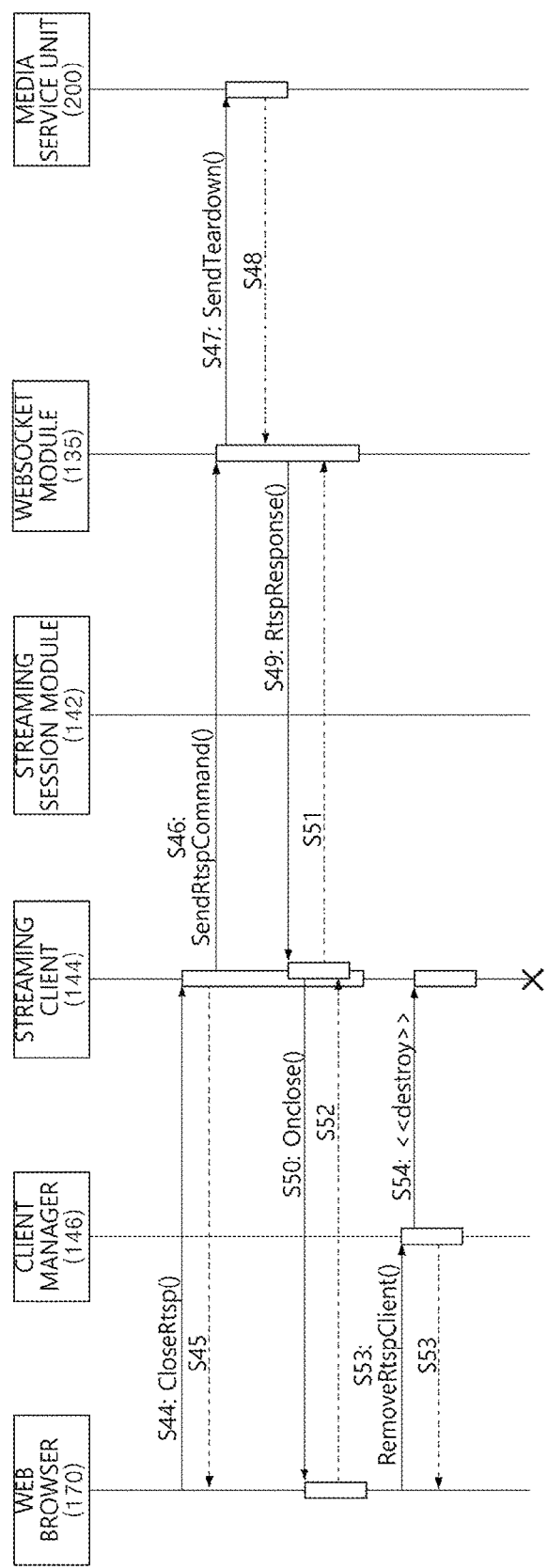
FIG. 14 is a sequence diagram showing a disconnection procedure when the connection between the streaming module and the media service unit is no longer necessary.

FIGS. 12 to 14 are sequence diagrams implementing the media service unit 200, the RTSP control and the RTP transfer by the streaming module 140 and the websocket module 135 according to an exemplary embodiment. The streaming client 144 may generate RTSP client instances and RTSP profile information, and manage authentication information. The websocket module 135 may perform functions related to the websocket, and may be used to transfer RTSP command by the streaming client 144 and to receive the response thereof. The connection sequence in the streaming client 144 comprises, in order, 1) initialization of the transfer module, 2) registration of RTSP response and RTP response callbacks, 3) transfer of description command (the description refers to a function, a property and specification information of a terminal device), and 4) initialization of RTP session and setup command. The arrows indicated in solid lines refer to specific commands, and the arrows indicated in dotted lines refer to responses and acknowledgements thereto.

FIG. 12 shows an RTSP setup procedure between the streaming module 140 and the media service unit 200. When the web browser 170 requests a client manager to create an RTSP client (operation S1: Create RtspClient), the client manager 146 causes the streaming client 144 to create a new RTSP client (operation S2: new RtspClient). After creating a new RTSP client, the web browser 170 sets an RTSP URL for the streaming module 140 and performs authentication (operation S5: Set RtspURL, Authentication). Thus, the web browser 170 is in a default state in which data can be transmitted or received to or from the media service unit 200.

When the web browser 170 requests the streaming client 144 to be connected to the media service unit 200 (operation S7: Connect), the streaming client 144 requests the websocket module 135 to send a new transport (operation S9: new Transport), and sets a callback (operation S11: Set callback). Further, when the streaming client 144 sends an RTSP command to the websocket module 135 (operation S13: Send RtspCommand), the websocket module 135 sends a description command to the media service unit 200 (operation S14: Describe command). Then, when the streaming client 144 sends a subsequent RTSP command to the websocket module 135 (operation S18: Send RtspCommand), the websocket module 135 sends a setup command to the media service unit 200 (operation S19: Setup command). Accordingly, when a setup response is received by the websocket module 135 from the media service unit 200 (operation S21: setup Response), the websocket module 135 transmits an RTSP response to the streaming client 144 (operation S22: RtspResponse).

Then, the streaming client 144 sends a create command of the RTSP session to the streaming session module 142 (operation S24: Create RtspSession), and sets a callback (operation S26: Set Callback). When informing the web browser 170 of callback connection completion (operation S28: OnConnectedCallback), the RTSP setup procedure between the streaming module 140 and the media service unit 200 is completed, thereby transmitting and receiving the RTP data between them over websockets.

FIG. 13 shows a process in which the streaming module 140 receives the RTP data from the media service unit 200 after the setup procedure of FIG. 12. When the web browser 170 sends a media access command to the streaming client 144 (operation S30: OpenMedia), the streaming client 144 sends an RTSP command to the websocket module 135 (operation S32: SendRtspCommand). Then, the websocket module 135 sends a media play command to the media service unit 200 (operation S33: Play Command). Thereafter, when the streaming client 144 receives an RTSP response from the websocket module 135 (operation S35: RtspRespond), the streaming client 144 informs the web browser 170 that the media can be open (operation S37: OnOpenMedia).

Meanwhile, the media service unit 200 performs transmission of RTP data to the websocket module 135 in accordance with the play command of operation S33 (operation S39: RTP Data→OnReceive). In this case, the websocket module 135 transmits the RTP data to the streaming session module 142 (operation S40: SendRtpData), and the streaming session module 142 transmits the media stream (media frame) contained in the RTP data to the web browser 170 (operation S41: OnFrameRecv). In the process of FIG. 13, even during the streaming of specific RTP data, the streaming client 144 may send the RTSP command to the media service unit 200, thereby performing control (play, pause, etc.) of the RTP data.

If the streaming of the RTP data as shown in FIG. 13 is completed and the connection between the streaming module 140 and the media service unit 200 is no longer necessary, a disconnection procedure may be performed as shown in FIG. 14. When the web browser 170 sends an RTSP close command to the streaming client 144 (operation S44: CloseRtsp), the streaming client 144 sends an RTSP command to the websocket module 135 (operation S46: SendRtspCommand). Accordingly, the websocket module 135 sends a teardown command to the media service unit 200 (operation S47: SendTeardown), and receives an Ack from the media service unit 200 (operation S48).

When the websocket module 135 sends an Rtsp response message to the streaming client 144 (operation S49: RtspResponse), the streaming client 144 sends a command of closing the media streaming to the web browser 170 (operation S50: Onclose). Then, when the web browser 170 sends a command of removing the Rtsp client which has already been created to the client manager 146 (operation S53: RemoveRtspClient), the client manager 146 sends a command of destroying the Rtsp client to the streaming client 144 (operation S54: destroy), and the connection between the streaming module 140 and the media service unit 200 is terminated.

At least one of the components, elements, modules or units represented by a block as illustrated in FIGS. 4, 8, 10, and 11 may be embodied as various numbers of hardware, software and/or firmware structures that execute respective functions described above, according to an exemplary embodiment. For example, at least one of these components, elements, modules or units may use a direct circuit structure, such as a memory, processing, logic, a look-up table, etc. that may execute the respective functions through controls of one or more microprocessors or other control apparatuses. Also, at least one of these components, elements, modules or units may be specifically embodied by a module, a program, or a part of code, which contains one or more executable instructions for performing specified logic functions. Also, at least one of these components, elements, modules or units may further include a processor such as a central processing unit (CPU) that performs the respective functions, a microprocessor, or the like.

According to the exemplary embodiments, the media can be streamed in real time from the media service unit 200 such as a network camera without installing a plug-in in the web browser 170. However, it is possible to implement a hybrid method using both a method of streaming the media without installing a plug-in and a method of streaming the media via a dedicated web viewer by installing a plug-in according to the user's selection. According to the above-described exemplary embodiment, when a user accesses to the media service unit 200 from the media stream playing apparatus 100, the media service unit 200 may confirm user environment information (e.g., the version of the web browser, the resolution of the user device, etc.) through the web server 230 and check whether a plug-in can be installed in the user environment. If a plug-in can be installed in the user environment, the web server 230 may provide a web page to the web browser 170 to check whether to install a plug-in and receive the user's selection. When the user selects plug-in installation, the user may download a web viewer from the web server 230 to be installed on the web browser 170, and use the installed web viewer as in the conventional method. On the other hand, if the user does not desire to install the plug-in, it is possible to play video/audio while controlling the media streaming without a plug-in according to the media streaming playing method of the exemplary embodiment.

Although the exemplary embodiments have been described for illustrative purposes, those skilled in the art will appreciate that various modifications, additions and substitutions are possible, without departing from the scope and spirit of the inventive concept as disclosed in the accompanying claims.

What is claimed is:

1. A media stream playing apparatus comprising at least one processor to implement:
   a transmission module configured to establish a communication connection at a transport layer level with a media service device;
   a websocket module configured to establish a websocket connection with the media service device based on the communication connection, and transmit or receive websocket packets to or from the media service device while maintaining the websocket connection;
   a streaming module configured to receive Real-time Transport Protocol (RTP) packets carried by the websocket packets; and
   a media decoder configured to decode a media stream obtained from the RTP packets to reconstruct video for displaying through a web browser,
   wherein the websocket module is configured to, in response to receiving a Real Time Streaming Protocol (RTSP) command from the streaming module, transmit a description command to the media service device, and in response to receiving a subsequent RTSP command, transmit a setup command to the media service device.

2. The media stream playing apparatus of claim 1, wherein, after an RTSP is set up between the streaming module and the media service device based on the setup command from the websocket module to the media service device, the streaming module is further configured to transmit or receive RTSP packets for controlling transmission of the RTP packets to or from the media service device, and
   wherein the communication connection established by the transmission module comprises a Transmission Control Protocol (TCP) connection.

3. The media stream playing apparatus of claim 1, wherein the web browser supports an HTML5 standard.

4. The media stream playing apparatus of claim 1, further comprising:
   a video renderer configured to perform video processing on the reconstructed video to render the reconstructed video; and
   an output device configured to display the rendered video through the web browser.

5. The media stream playing apparatus of claim 1, wherein the streaming module and the media decoder are configured to be implemented by JavaScript without a plug-in program in the web browser.

6. The media stream playing apparatus of claim 5, wherein the media decoder comprises a video decoder and an audio decoder which are implemented by the JavaScript.

7. The media stream playing apparatus of claim 6, wherein the media decoder further comprises an audio encoder configured to encode audio captured by the media stream playing apparatus for two-way audio communication between the media stream playing apparatus and the media service device.

8. The media stream playing apparatus of claim 1, wherein an RTSP is set up between the streaming module and the media service device based on an RTSP response transmitted from the web socket module to a streaming client.

9. The media stream playing apparatus of claim 1, wherein, based on a determination that a plug-in can be installed in a user environment, the web browser provides a web page to receive a user's selection whether to install the plug-in.

10. The media stream playing apparatus of claim 9, wherein the media decoder is configured to decode the media stream obtained from the RTP packets carried by the websocket packets in response to receiving the user's selection not to install the plug-in.

11. A media service device comprising at least one processor to implement:
  a media server configured to convert a real-time live video or stored video into Real-time Transport Protocol (RTP) packets; and
  a web server configured to establish a connection with a media stream playing apparatus, and transmit the RTP packets over a websocket protocol to the media stream playing apparatus in response to a request from the media stream playing apparatus,
  wherein, prior to transmission of the RTP packets, a Real Time Streaming Protocol (RTSP) is set up between the media service device and the media stream playing apparatus, based on a websocket connection between the media service device and the media stream playing apparatus.

12. The media service device of claim 11, wherein the RTP packets transmitted over the websocket protocol comprise a websocket header, an RTP header, and a media stream.

13. The media service device of claim 11, further comprising a camera module configured to capture the real-time live video, and a media encoder configured to encode the captured video,
  wherein the web server is configured to transmit the encoded video in real time to the media stream playing apparatus.

14. The media service device of claim 13, wherein the video encoded by the media encoder is stored for long-term storage, or temporarily stored to support streaming via the media server.

15. The media service device of claim 11, wherein the media server is configured to buffer the captured video, packetize the buffered video, and generate the RTP packets, and
  wherein the web server is configured to establish a communication session with the media stream playing apparatus for transmission of the RTP packets, transmit the RTP packets over the websocket protocol to the media stream playing apparatus, and perform transmission controls on the transmitted RTP packets.

16. The media service device of claim 11, wherein the web server is configured to support an HTML5 standard.

17. The media service device of claim 11, further comprising a proxy socket configured to encode communication data transmitted by the media server into websocket packets to be transmitted to the media stream playing apparatus, and decode websocket packets received from the media stream playing apparatus in a data format supported by the media server.

18. The media service device of claim 17, wherein the proxy socket is further configured to relay data transmission and reception between the media server and the web server through a predetermined socket.

19. The media service device of claim 11, wherein the media service device comprises a real-time video camera or a network video recorder,
  wherein the media stream playing apparatus comprises a web browser, and
  wherein the connection established by the web server comprises a Transmission Control Protocol (TCP) connection and the websocket connection established based on the TCP connection.

20. A media service method comprising:
  converting a real-time live video or stored video into Real-time Transport Protocol (RTP) packets;
  establishing a connection with a media stream playing apparatus; and
  transmitting the RTP packets over a websocket protocol to the media stream playing apparatus in response to a request from the media stream playing apparatus,
  wherein, prior to the transmitting the RTP packets, the media service method further comprises performing a Real Time Streaming Protocol (RTSP) setup procedure with the media stream playing apparatus, based on a websocket connection with the media stream playing apparatus.

21. The media service method of claim 20, wherein the RTP packets transmitted over the websocket protocol comprise a websocket header, an RTP header, and a media stream.

22. The media service method of claim 20, further comprising capturing the real-time live video by a camera module, and encoding the captured video,
  wherein the transmitting the RTP packets comprises transmitting in real time the encoded video to the media stream playing apparatus by a web server.

23. The media service method of claim 20, wherein the converting the encoded video into RTP packets comprises buffering the captured video, packetizing the buffered video, and generating the RTP packets, and
  wherein the transmitting the RTP packets comprises establishing a communication session with the media stream playing apparatus for transmission of the RTP packets, transmitting the RTP packets over the websocket protocol to the media stream playing apparatus, and performing transmission controls on the transmitted RTP packets.

* * * * *